(12) United States Patent
Baratta

(10) Patent No.: US 8,333,182 B1
(45) Date of Patent: Dec. 18, 2012

(54) SAW BLADE WITH SLOT FOR REDUCTION OF THERMAL CRACKING

(75) Inventor: Anthony Baratta, Oak Park, CA (US)

(73) Assignee: Western Saw, Oxnard, CA (US)

( * ) Notice: Subject to any disclaimer, the term of this patent is extended or adjusted under 35 U.S.C. 154(b) by 611 days.

(21) Appl. No.: 12/583,771

(22) Filed: Aug. 25, 2009

(51) Int. Cl.
   *B28D 1/04* (2006.01)
(52) U.S. Cl. .......... 125/15; 83/676; 125/13.01; 451/449
(58) Field of Classification Search .............. 83/676, 83/835, 839, 840; 125/13.01, 15, 18, 19; 451/449, 488, 540, 541, 542, 544, 547
   See application file for complete search history.

(56) References Cited

U.S. PATENT DOCUMENTS

| | | | | |
|---|---|---|---|---|
| 3,730,038 A | * | 5/1973 | Farb ................................ | 83/837 |
| 4,462,382 A | * | 7/1984 | Baron et al. ..................... | 125/15 |
| 4,516,560 A | * | 5/1985 | Cruickshank et al. .......... | 125/15 |
| 4,583,515 A | * | 4/1986 | Ballenger ........................ | 125/15 |
| D345,683 S | * | 4/1994 | Johnston .......................... | D8/70 |
| 5,524,518 A | * | 6/1996 | Sundstrom ....................... | 83/845 |
| 5,555,788 A | * | 9/1996 | Gakhar et al. ................... | 83/835 |
| 5,839,423 A | * | 11/1998 | Jones et al. ...................... | 125/15 |
| 6,408,838 B1 | * | 6/2002 | Ogata et al. ..................... | 125/15 |
| 7,156,010 B2 | * | 1/2007 | Asada .............................. | 83/835 |
| 2003/0061920 A1 | * | 4/2003 | Thompson ........................ | 83/13 |

* cited by examiner

*Primary Examiner* — Timothy V Eley
(74) *Attorney, Agent, or Firm* — Sandy Lipkin

(57) ABSTRACT

An improved slot for a circular saw blade that reduces thermal cracking that occurs during the use of the blade. The slot extends from the peripheral edge of the blade in a vertical direction toward the center of the blade. It has an initial channel that takes a slight curve as it extends toward the center of the blade, but remains in a substantially vertical orientation until it terminates in a curve that is convex when viewed from the peripheral edge toward the center hole. The curve extends in both directions away from the channel portion. The first curve extends at a length that is longer than the length of the second curve. The curve does not complete a circle, but resembles a circle that has had been snipped at one point and one side hangs down below the other. Each curve terminates in an aperture.

1 Claim, 3 Drawing Sheets

SAW BLADE WITH SLOT FOR REDUCTION OF THERMAL CRACKING

BACKGROUND OF THE INVENTION

1. Field of the Invention

The field of this invention relates generally toward cutting blades for saws and particularly toward a specialized slot that significantly reduces thermal cracking.

2. Description of the Prior Art

Circular saw blades typically have a series of tips around the perimeter that are reinforced with a cutting material to aid with the cutting of hard surfaces, such as concrete and the like. These tips are cut into the plate and reinforced with a strong cutting material, such as diamonds or carbide, which are then added to the tips using high temperatures.

These series of tips are often separated by lasered slots that provide a means for the reduction of stress to the blade during use. Such stresses include deformation and strain caused from the heat generated during use. Often this thermal strain is sufficient enough to crack the blade and reduce or eliminate its utility. Prior art slots that have shown some effectiveness are slots that are vertically oriented from the perimeter of the blade and toward the center of the blade. One prior art modification has this vertical slot terminating in a semi-circular curve with two holes at the end of side of the semi-circular curve.

However, these blades, also referred to as cores, are susceptible to cracking in hard aggregate conditions. The cracks have occurred in two failure modes. The first mode has the crack initating at the apex of the furthermost side of the aforementioned slot that includes the semi-circular curve and propagating tangentially to the closest apex of an adjacent slot. The second mode initiates near the base of the aforementioned slot that includes the semi-circular curve and propagates at approximately a 60 degree angle towards the center of the blade, toward the whole where the blade mounts to an arbor.

There exists a need for an improved slot that reduces or eliminates the thermal cracking seen in prior art slots.

SUMMARY OF THE INVENTION

The instant invention teaches a saw blade comprising: a front face; a rear face; an arbor mount aperture extending through the front face and the rear face; a peripheral edge extending at a radius from the arbor mount; a plurality of tips alongside the peripheral edge with a plurality of gaps between each of the plurality of tips; a plurality of slots, each of the plurality of slots to be positioned in each of the plurality of gaps, the slots extending through the front face and the rear face and extending from the peripheral edge in a vertical direction toward the arbor mount aperture, each of the plurality of slots further comprising: a channel that takes a slight curve as it extends toward the arbor mount aperture while remaining in a substantially vertical orientation until it terminates in a curve that is convex when viewed from the peripheral edge toward the arbor mount aperture, the curve extending in a first direction terminating in a first end and having a first length and a second direction terminating in a second end and having a second length, both the first end and the second end being substantially curved but not forming a complete circle but rather the first end terminating in a first aperture and the second end terminating in a second aperture wherein the first length is longer than the second length.

DETAILED DESCRIPTION OF A PREFERRED EMBODIMENT

Figure 1:
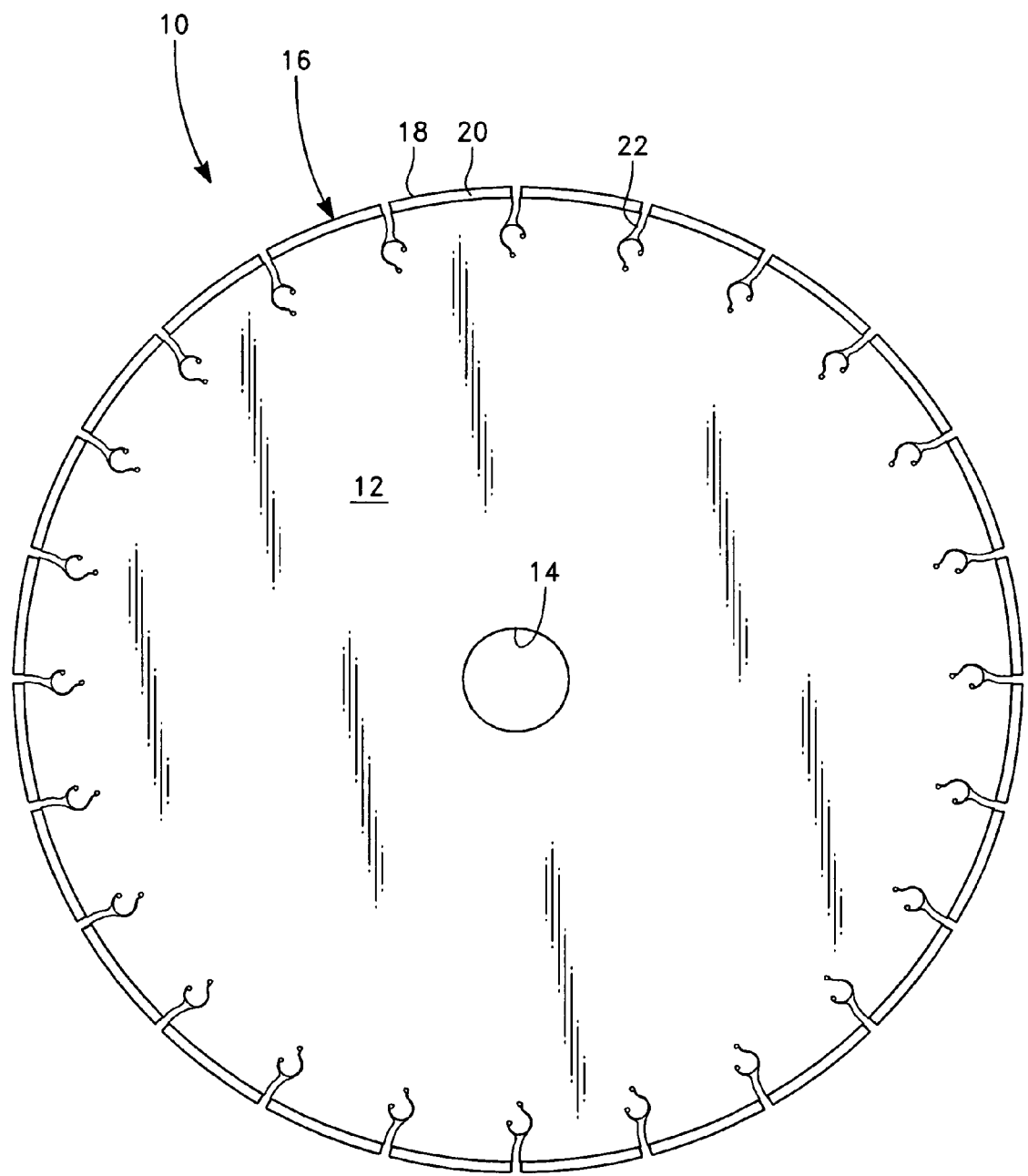
FIG. 1 is a front view of the cutting disc of the instant invention.

Turning to the drawings, the preferred embodiment is illustrated and described by reference characters that denote similar elements throughout the several views of the instant invention.

Referring particular to FIG. 1, we see a circular saw blade 10. The blade 10 includes a front face 12, a center hole 14 for mounting to an arbor and a peripheral edge 16. The peripheral edge includes a series of tips 18 that are reinforced with carbide, diamonds or other strong cutting material 20. In between each tip 18 is the slot 22 of the instant invention.

Figure 2:
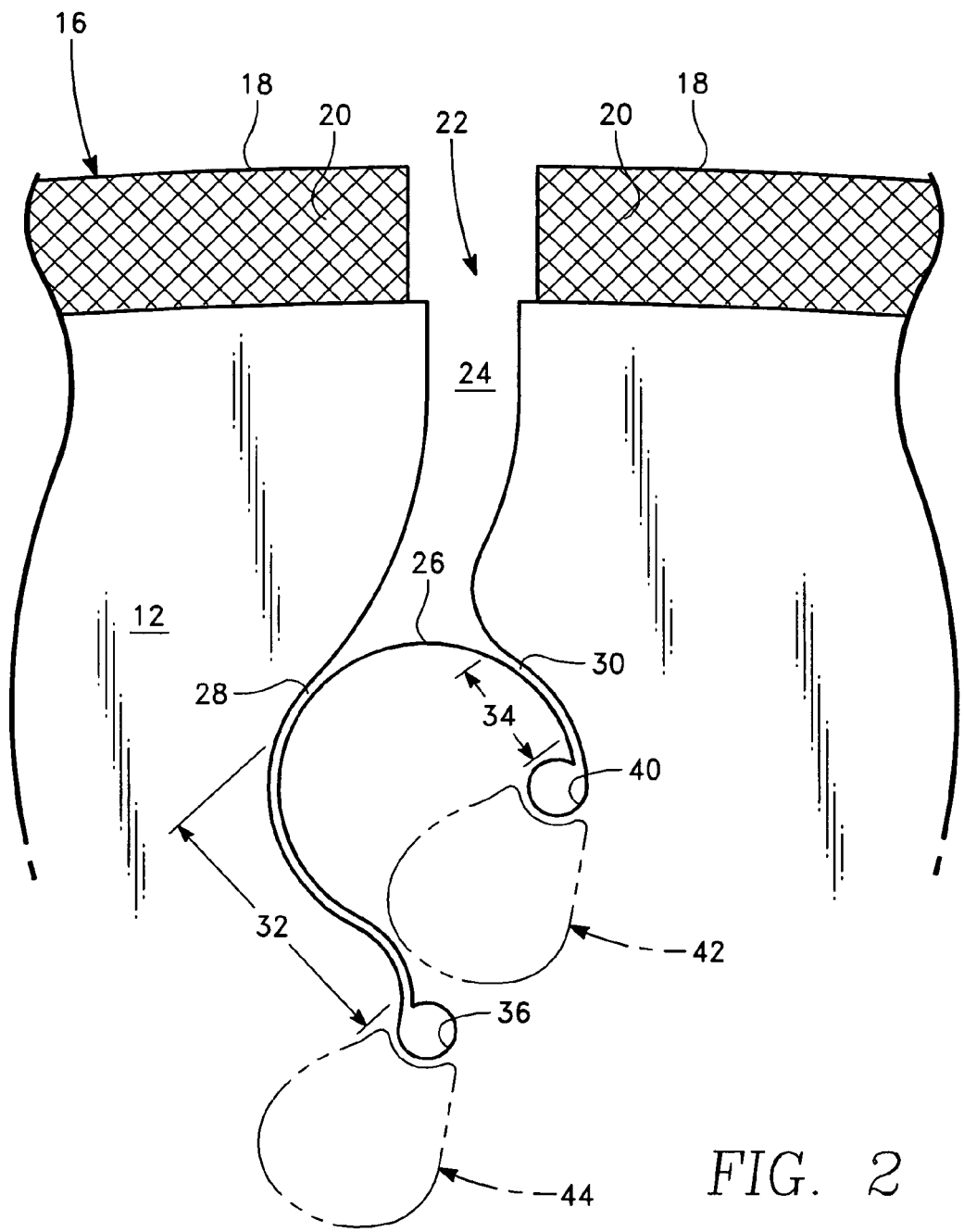
FIG. 2 is a close up view of one of the slots of the instant invention.

A close up view of the slot 22 is shown in FIG. 2. The unexpected shape of this slot 22 has been tested and shown to be surprisingly ideal for the reduction and near elimination of thermal cracking. The slot 22 extends from the peripheral edge 16 in a vertical direction toward the center of the blade 10. It has an initial channel that takes a slight curve as it extends toward the center of the blade, but remains in a substantially vertical orientation until it terminates in a curve 26 that is convex when viewed from the peripheral edge 16 toward the center hole 14. The curve extends in both directions away 28, 30 from the channel portion 24. The first curve 28 extends at a length 32 that is longer than the length 34 of the second curve 30. The curve 26 does not complete a circle, but resembles a circle that has had been snipped at one point and one side hangs down below the other. Each curve 28, 30 terminates in an aperture 36, 40. Between these two apertures 36, 40 is a first space 42 that will absorb a major portion of the thermal stress. Beneath the termination of the first curve 28 and the aperture 36 found there is a second space 44 that will absorb the remainder of the thermal stress. This is illustrated in FIG. 3C and compared with prior art slots in FIGS. 3A-3B.

Figure 3A:
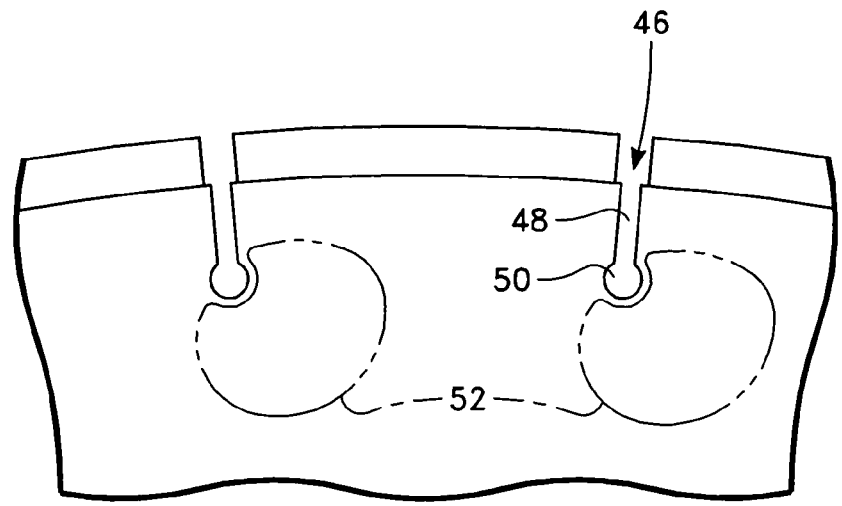
FIG. 3A depicts the amount of thermal cracking demonstrated when using one prior art slot.

In FIG. 3A we see one prior art version of the slot 46. This type of slot is basically a vertical channel 48 that terminates in an aperture 50. The areas highlighted in gray 52 show where the stresses occur and how much area is affected when this prior art slot is used.

Figure 3B:
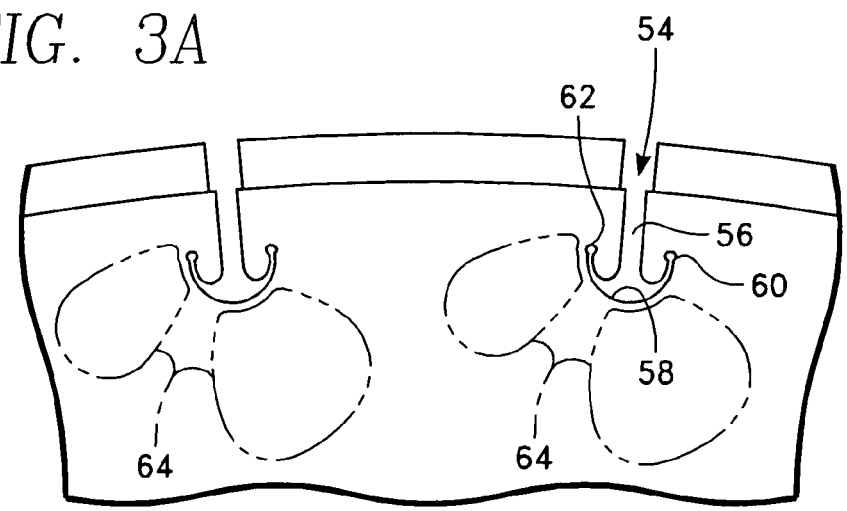
FIG. 3B depicts the amount of thermal cracking demonstrated when using a second prior art slot.

In FIG. 3B we see a second prior art version of the slot 54, of the aforementioned semi-circular terminating slots. This slot 54 has the vertical channel 56 that terminates in a semi-circular curve 58. This semi-circular curve 58 terminates in an aperture 60, 62 at each end. The areas highlighted in gray 58 show where the stresses occur and how much area is affected when this prior art slot is used.

Figure 3C:
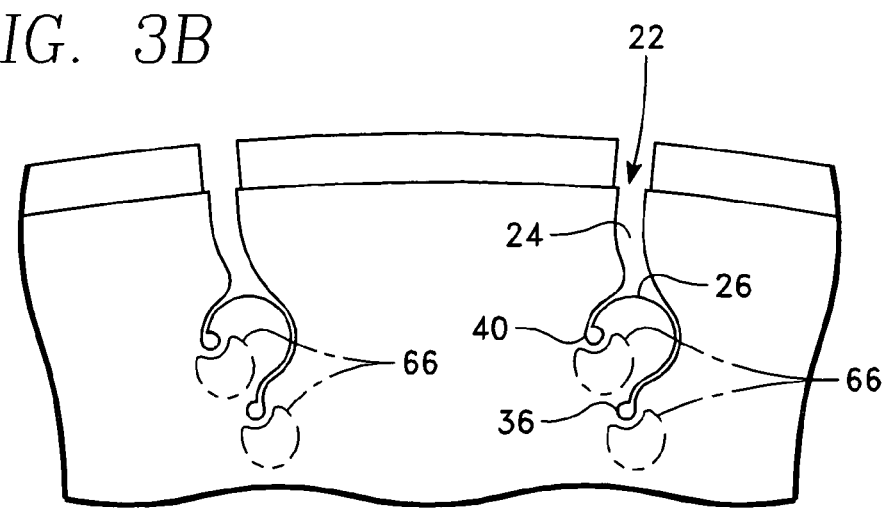
FIG. 3C depicts the amount of thermal cracking demonstrated when using the slot of the instant invention.

FIG. 3C shows the slot of the instant invention 22. The small areas marked in gray 66 show how much stress occurs when this slot is used. It is the unique design of this curve that provides the unexpected result of reduced thermal cracking when this blade 10 is put to use.

The discussion included in this patent is intended to serve as a basic description. The reader should be aware that the specific discussion may not explicitly describe all embodiments possible and alternatives that are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. A saw blade comprising:
   a front face;
   a rear face;
   an arbor mount aperture extending through said front face and said rear face;
   a peripheral edge extending at a radius from said arbor mount aperture;
   a plurality of tips alongside said peripheral edge with a plurality of gaps between each of said plurality of tips;
   a plurality of slots, each of said plurality of slots positioned in each of said plurality of gaps, said slots extending through said front face and said rear face and extending from said peripheral edge in a vertical direction toward said arbor mount aperture, each of said plurality of slots further comprising:
      a channel that takes a slight curve as it extends toward said arbor mount aperture while remaining in a substantially vertical orientation until it terminates in a curve that is convex when viewed from said peripheral edge toward said arbor mount aperture, said curve extending in a first direction terminating in a first end and having a first length and a second direction terminating in a second end and having a second length, both said first end and said second end being substantially curved but not forming a complete circle but rather said first end terminating in a first aperture and said second end terminating in a second aperture wherein said first length is longer than said second length.

* * * * *